(12) United States Patent
Takeda

(10) Patent No.: US 12,339,124 B2
(45) Date of Patent: Jun. 24, 2025

(54) POSITION SPACE IDENTIFICATION METHOD, POSITION SPACE IDENTIFIER IMPARTING DEVICE, AND COMPUTER PROGRAM

(71) Applicant: CUBE EARTH CO., LTD., Osaka (JP)

(72) Inventor: Masafumi Takeda, Osaka (JP)

(73) Assignee: CUBE EARTH CO., LTD., Osaka (JP)

( * ) Notice: Subject to any disclaimer, the term of this patent is extended or adjusted under 35 U.S.C. 154(b) by 541 days.

(21) Appl. No.: 17/629,203

(22) PCT Filed: Jul. 22, 2020

(86) PCT No.: PCT/JP2020/028442
§ 371 (c)(1),
(2) Date: Jan. 21, 2022

(87) PCT Pub. No.: WO2021/020274
PCT Pub. Date: Feb. 4, 2021

(65) Prior Publication Data
US 2022/0236062 A1    Jul. 28, 2022

(30) Foreign Application Priority Data
Jul. 26, 2019   (JP) .................................. 2019-138290

(51) Int. Cl.
*G01C 21/24*    (2006.01)
*G01C 21/02*    (2006.01)

(52) U.S. Cl.
CPC ............ *G01C 21/24* (2013.01); *G01C 21/02* (2013.01)

(58) Field of Classification Search
None
See application file for complete search history.

(56) References Cited

FOREIGN PATENT DOCUMENTS

| JP | 5-215848 A | 8/1993 |
|---|---|---|
| JP | 2000-181345 A | 6/2000 |

(Continued)

OTHER PUBLICATIONS

International Search Report mailed Oct. 13, 2000 in corresponding PCT Application No. PCT/JP2020/028442 (3 pages) (3 pages English Translation).

(Continued)

*Primary Examiner* — Daniel L Greene
*Assistant Examiner* — Robert L Pinkerton
(74) *Attorney, Agent, or Firm* — STAAS & HALSEY LLP

(57) ABSTRACT

The present invention provides a method for imparting unique identifiers that do not overlap each other to individual position spaces in the case of latitude and longitude information or even in the case of height information also included in addition thereto. A longitude line passing through the coordinate origin is divided by the length of one side of a unit grid, and a latitude value inside unit grids is calculated. An accumulated error is calculated in a case where latitude values inside the unit grids are accumulated for one round in a longitude line direction of a celestial body, and an error per unit grid is calculated based on the calculated accumulated error. The number of unit grids included in one block in the longitude line direction is specified so that a reference error per block is equal to or smaller than one thousandth of the accumulated error, and thus a reference latitude is set. A reference longitude is set by the same calculation process for each latitude line that is determined based on the set reference latitude, reference points are specified sequentially from the coordinate origin based on the set reference latitude and reference longitude, and a unique identifier is imparted to each unit grid located in a block with the reference points set as its vertices.

20 Claims, 10 Drawing Sheets

(56) References Cited

FOREIGN PATENT DOCUMENTS

| | | |
|---|---|---|
| JP | 2008-165096 A | 7/2008 |
| WO | WO 2014/108957 A1 | 7/2014 |
| WO | WO 2017/029885 A1 | 2/2017 |
| WO | WO 2019/003609 A1 | 1/2019 |

OTHER PUBLICATIONS

Written Opinion mailed Oct. 13, 2020 in corresponding PCT Application No. PCT/JP2020/028442 (4 pages).

POSITION SPACE IDENTIFICATION METHOD, POSITION SPACE IDENTIFIER IMPARTING DEVICE, AND COMPUTER PROGRAM

CROSS-REFERENCE TO RELATED APPLICATIONS AND INCORPORATION BY REFERENCE

This application is a U.S. National Stage Application under 35 U.S.C. § 371 of PCT International Patent Application No. PCT/JP2020/028442, filed on Jul. 22, 2020, which claims the foreign priority benefit under 35 U.S.C § 119 of Japanese Patent Application No. 2019-138290, filed on Jul. 26, 2019 in the Japanese Patent Office, the contents of both of which the International Patent Application and the Japanese Patent Application are incorporated by reference herein in their entirety.

TECHNICAL FIELD

The present invention relates to a position space identification method, a position space identifier imparting device, and a computer program, in which a position space on a celestial body such as the earth can be divided, with unique identifiers that do not overlap each other being assigned.

BACKGROUND ART

Conventionally, satellite-based position information systems such as GPS have been used in many fields. In particular, with the recent proliferation of portable terminal devices such as smartphones, such position information systems are often incorporated also in a wide variety of applications that use position information.

When GPS is used, a position is specified according to latitude and longitude information measured by GPS. However, when the latitude and longitude information is to be shared among a plurality of people, it is difficult to share the latitude and longitude as they are obtained. Therefore, some measures have been devised to convert them into, for example, some unique words or IDs and then to share the latitude and longitude information.

For example, Patent Document 1 discloses a communication method in which latitude and longitude information obtained by GPS is converted correspondingly into unique numerical values and then each numerical value is converted into a meaningful word. In Patent Document 1, the latitude and longitude information is eventually converted into a meaningful word, which makes it easy to share it among a plurality of people.

PRIOR ART DOCUMENTS

Patent Documents

[Patent Document 1] JP6417397B

DISCLOSURE OF INVENTION

Problem to be Solved by the Invention

However, in Patent Document 1, since the identifiers associated with latitude and longitude information are stored as a correspondence table, only users who share the table itself can use common identifiers to specify latitude and longitude information. In other words, when different correspondence tables are used, identifiers cannot be made common and thereby latitude and longitude information cannot be shared, which has been a problem. Furthermore, while it is also possible to block the latitude and longitude information associated with an identifier, the block size has not been standardized. Therefore, the correspondence table itself differs among users with different block sizes. Thus, even when the latitude and longitude are the same, the identifiers that are associated with them are different and thereby it becomes impossible to share the latitude and longitude information, which has also been a problem.

With not only latitude and longitude information but also height information added thereto, an extension also can be made so as to easily assign identifiers for three-dimensional spaces. However, even in the case of identifying a three-dimensional space, the problems described above are not solved.

The present invention was made with such circumstances in mind, and it is an object of the present invention to provide a position space identification method, a position space identifier imparting device, and a computer program, in which it is possible to impart unique identifiers that do not overlap each other to individual position spaces in the case of latitude and longitude information or even in the case of height information also included in addition thereto.

Means for Solving Problem

In order to achieve the object described above, a position space identification method according to the present invention is a position space identification method using a computer to divide a position space on a celestial body into a plurality of equal blocks and to impart a non-overlapping unique identifier to each unit grid with a predetermined length that constitutes a block, wherein the computer includes: a step of accepting a setting of an arbitrary coordinate origin; a step of dividing a longitude line passing through the coordinate origin whose setting has been accepted, by the length of one side of the unit grid, and calculating latitude values inside unit grids thus divided; a step of calculating an accumulated error obtained in a case where the latitude values inside the unit grids are accumulated for one round in a longitude line direction of the celestial body; a step of calculating an error per unit grid based on the accumulated error calculated above; a step of specifying the number of unit grids included in one block in the longitude line direction so that based on the error per unit grid calculated above, a reference error per block is equal to or smaller than one thousandth of the accumulated error; a step of sequentially setting a reference latitude from the coordinate origin for each block determined by the number of unit grids specified above; a step of dividing a latitude line for each reference latitude described above from the coordinate origin whose setting has been accepted, by the length of one side of the unit grid, and calculating longitude values inside unit grids divided for each latitude line described above; a step of calculating an accumulated error obtained in a case where the longitude values for each latitude line described above are accumulated for one round in a latitude line direction of the celestial body; a step of calculating an error per unit grid for each latitude line described above based on the accumulated error calculated for each latitude line described above; a step of specifying the number of unit grids included in one block in the latitude line direction for each latitude line described above so that based on the error per unit grid calculated above, a reference error per block is equal to or smaller than one thousandth of the accumulated error; a step of sequentially setting a reference longitude for each latitude line described above for each block determined by the number of unit grids specified above; a step of sequentially specifying reference points from the coordinate origin based on reference latitudes and reference longitudes that have been set; and a step of imparting a unique identifier to each unit grid located in each block with the reference points specified above as its vertices.

Furthermore, in the position space identification method according to the present invention, it is preferable that the length of the latitude line for each reference latitude described above be the product of the cosine of the latitude value and the equatorial length.

Moreover, in the position space identification method according to the present invention, it is preferable that in the vicinity of the coordinate origin where an overlap occurs when blocks, each surrounded by the reference points, are arranged over an entire circumference from the coordinate origin, it be determined whether or not a unique identifier has already been imparted to an overlapping unit grid, and when it is determined that a unique identifier has already been imparted, the unique identifier that has already been imparted be selected as the identifier for said unit grid.

Furthermore, in the position space identification method according to the present invention, it is preferable that a distance on the surface of the celestial body corresponding to the reference latitude, or the reference longitude be used as a unit height to construct a unit 3D grid with the height added to the unit grid, and a unique identifier be imparted to each unit 3D grid for a position space in three-dimensional space.

Next, in order to achieve the object described above, the position space identifier imparting device according to the present invention is a position space identifier imparting device that divides a position space on a celestial body into a plurality of equal blocks and imparts a non-overlapping unique identifier to each unit grid with a predetermined length that constitutes a block, wherein the position space identifier imparting device is characterized by including: a coordinate origin accepting means that accepts a setting of an arbitrary coordinate origin; a latitude value calculation means that divides a longitude line passing through the coordinate origin whose setting has been accepted, by the length of one side of the unit grid, and calculates latitude values inside unit grids thus divided; an accumulated latitude value error calculation means that calculates an accumulated error obtained in a case where the latitude values inside the unit grids are accumulated for one round in a longitude line direction of the celestial body; a latitude value grid error calculation means that calculates an error per unit grid based on the accumulated error calculated above; a longitude line direction number-of-grid specifying means that specifies the number of unit grids included in one block in the longitude line direction so that based on the error per unit grid calculated above, a reference error per block is equal to or smaller than one thousandth of the accumulated error; a reference latitude setting means that sequentially sets a reference latitude from the coordinate origin for each block determined by the number of unit grids specified above; a longitude value calculation means that divides a latitude line for each reference latitude described above from the coordinate origin whose setting has been accepted, by the length of one side of the unit grid, and calculates longitude values inside unit grids divided for each latitude line described above; an accumulated longitude value error calculation means that calculates an accumulated error obtained in a case where longitude values for each latitude line described above are accumulated for one round in a latitude line direction of the celestial body; a longitude value grid error calculation means that calculates an error per unit grid for each latitude line described above based on the accumulated error calculated for each latitude line described above; a latitude line direction number-of-grid specifying means that specifies the number of unit grids included in one block in the latitude line direction for each latitude line described above so that based on the error per unit grid calculated above, a reference error per block is equal to or smaller than one thousandth of the accumulated error; a reference longitude setting means that sequentially sets a reference longitude for each latitude line described above for each block determined by the number of unit grids specified above; a reference point specifying means that sequentially specifies reference points from the coordinate origin based on reference latitudes and reference longitudes that have been set; and an identifier imparting means that imparts a unique identifier to each unit grid located in each block with the reference points specified above as its vertices.

Furthermore, in the position space identifier imparting device according to the present invention, it is preferable that the length of the latitude line for each reference latitude described above be the product of the cosine of the latitude value and the equatorial length.

Moreover, it is preferable that the position space identifier imparting device according to the present invention include: an identifier determination means that determines whether or not a unique identifier has already been imparted to an overlapping unit grid in the vicinity of the coordinate origin where an overlap occurs when blocks, each surrounded by the reference points, are arranged over an entire circumference from the coordinate origin; and an identifier selection means in which when the identifier determination means determines that a unique identifier has already been imparted, the unique identifier that has already been imparted is selected as the identifier for said unit grid.

Furthermore, in the position space identifier imparting device according to the present invention, it is preferable that a distance on the surface of the celestial body corresponding to the reference latitude or the reference longitude be used as a unit height to construct a unit 3D grid with the height added to the unit grid, and the identifier imparting means impart a unique identifier to each unit 3D grid for a position space in three-dimensional space.

Next, in order to achieve the object described above, the computer program according to the present invention is a computer program that can be executed by a computer constituting a position space identifier imparting device that divides a position space on a celestial body into a plurality of equal blocks and imparts a non-overlapping unique identifier to each unit grid with a predetermined length that constitutes a block, wherein the computer is made to function as: a coordinate origin accepting means that accepts a setting of an arbitrary coordinate origin; a latitude value calculation means that divides a longitude line passing through the coordinate origin whose setting has been accepted, by the length of one side of the unit grid, and calculates latitude values inside unit grids thus divided; an accumulated latitude value error calculation means that calculates an accumulated error obtained in a case where the latitude values inside the unit grids are accumulated for one round in a longitude line direction of the celestial body; a latitude value grid error calculation means that calculates an error per unit grid based on the accumulated error calculated above; a longitude line direction number-of-grid specifying means that specifies the number of unit grids included in one block in the longitude line direction so that based on the error per unit grid calculated above, a reference error per block is equal to or smaller than one thousandth of the accumulated error; a reference latitude setting means that sequentially sets a reference latitude from the coordinate origin for each block determined by the number of unit grids specified above; a longitude value calculation means that divides a latitude line for each reference latitude described above from the coordinate origin whose setting has been accepted, by the length of one side of the unit grid, and calculates longitude values inside unit grids divided for each latitude line described above; an accumulated longitude value error calculation means that calculates an accumulated error obtained in a case where the longitude values for each latitude line described above are accumulated for one round in a latitude line direction of the celestial body; a longitude value grid error calculation means that calculates an error per unit grid for each latitude line described above based on the accumulated error calculated for each latitude line described above; a latitude line direction number-of-grid specifying means that specifies the number of unit grids included in one block in the latitude line direction for each latitude line described above so that based on the error per unit grid calculated above, a reference error per block is equal to or smaller than one thousandth of the accumulated error; a reference longitude setting means that sequentially sets a reference longitude for each latitude line described above for each block determined by the number of unit grids specified above; a reference point specifying means that sequentially specifies reference points from the coordinate origin based on reference latitudes and reference longitudes that have been set; and an identifier imparting means that imparts a unique identifier to each unit grid located in each block with the reference points specified above as its vertices.

Furthermore, in the computer program according to the present invention, it is preferable that the length of the latitude line for each reference latitude described above be the product of the cosine of the latitude value and the equatorial length.

Moreover, in the computer program according to the present invention, it is preferable that the computer be made to function as: an identifier determination means that determines whether or not a unique identifier has already been imparted to an overlapping unit grid in the vicinity of the coordinate origin where an overlap occurs when blocks, each surrounded by the reference points, are arranged over an entire circumference from the coordinate origin; and an identifier selection means, in which when the identifier determination means determines that a unique identifier has already been imparted, the unique identifier that has already been imparted is selected as the identifier for said unit grid.

Furthermore, in the computer program according to the present invention, it is preferable that a distance on the surface of the celestial body corresponding to the reference latitude or the reference longitude be used as a unit height to construct a unit 3D grid with the height added to the unit grid, and the identifier imparting means be made to function as a means for imparting a unique identifier to each unit 3D grid for a position space in three-dimensional space.

Effects of the Invention

According to the inventions described above, even for a celestial body that is not a true sphere such as the earth, the distance between reference points is determined so that the error in a block from the coordinate origin that serves as a reference is equal to or smaller than one thousandth of the accumulated error for the entire latitude or longitude line. Therefore, when the coordinate origin is common, the distance between reference points is uniquely determined, and it becomes possible to impart a non-overlapping unique identifier to each position space surrounded by the reference points. Thus, unique identifiers that do not overlap each other can be imparted to all position spaces on the celestial body. In other words, it is possible to ensure that position spaces that are identical in latitude and longitude (alternatively, also height in addition thereto) always have a common unique identifier, which makes it easy to transfer data between a plurality of applications that use position information and also makes it possible to improve system response.

DESCRIPTION OF THE INVENTION

Figure 1:
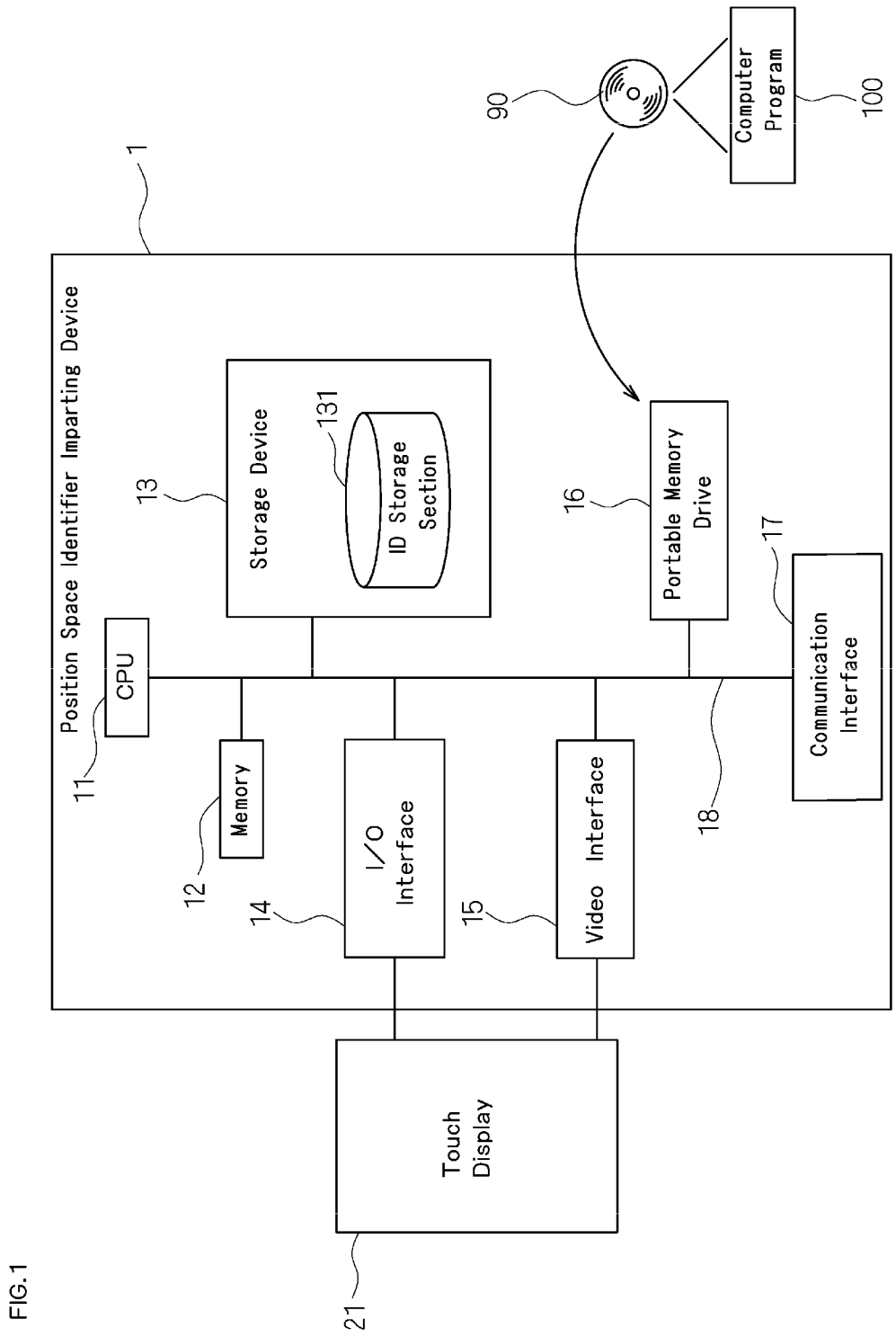
FIG. 1 is a block diagram that schematically shows a configuration of a position space identifier imparting device according to an embodiment of the present invention.

Hereinafter, a position space identifier imparting device according to an embodiment of the present invention and a position space identification method using the position space identifier imparting device will be specifically described with reference to the drawings. The following embodiment does not limit the inventions described in the claims, and not all of the combinations of the characteristics described in the embodiment should necessarily be essential for the means for solving problems.

Furthermore, the present invention can be implemented in many different modes and should not be construed as being limited to the description of the embodiment. Identical reference numerals are used for identical elements throughout the embodiment.

In the following embodiment, a position space identifier imparting device in which a computer program is introduced in a computer system will be described. However, as will be apparent to those skilled in the art, the present invention can be implemented as a computer program that can be executed in part by a computer. Therefore, the present invention can be embodied as hardware called a position space identifier imparting device, as software, or as a combination of software and hardware, which divides a position space on a celestial body into a plurality of equal blocks and imparts a non-overlapping unique identifier to each unit grid with a predetermined length that constitutes a block. The computer program can be recorded on a recording medium readable by any computer, such as a hard disk, a DVD, a CD, an optical storage device, or a magnetic storage device.

According to the embodiment of the present invention, even for a celestial body that is not a true sphere such as the earth, the distance between reference points is determined so that the error in a block from the coordinate origin that serves as a reference is equal to or smaller than one thousandth of the accumulated error for the entire latitude or longitude line. Therefore, when the coordinate origin is common, the distance between reference points is uniquely determined, and it becomes possible to impart a non-overlapping unique identifier to each position space surrounded by the reference points. Thus, unique identifiers that do not overlap each other can be imparted to all position spaces on the celestial body. In other words, it is possible to ensure that position spaces that are identical in latitude and longitude (alternatively, also height in addition thereto) always have a common unique identifier, which makes it easy to transfer data between a plurality of applications that use position information and also makes it possible to improve system response.

FIG. 1 is a block diagram that schematically shows a configuration of the position space identifier imparting device according to the embodiment of the present invention. The position space identifier imparting device 1 according to the present embodiment may be a portable terminal device that can be carried by a user, or a fixed computer such as a server that is connected to a portable terminal device so as to enable data communication with it. In the case of a portable terminal device, a current position of a user can be acquired by, for example, GPS and then an identifier for the current position can be easily specified.

The position space identifier imparting device 1 according to the present embodiment consists of at least a CPU (central processing unit) 11, a memory 12, a storage device 13, an I/O interface 14, a video interface 15, a portable memory drive 16, a communication interface 17, and an internal bus 18 that connects the hardware described above.

The CPU 11 is connected to the above-mentioned respective hardware units of the position space identifier imparting device 1 through the internal bus 18. The CPU 11 controls the operations of the respective hardware units described above and performs various software functions according to a computer program 100 stored in the storage device 13. The memory 12 is composed of a volatile memory such as SRAM or SDRAM. A load module is deployed during execution of the computer program 100, and the memory 12 stores, for example, temporary data generated during the execution of the computer program 100.

The storage device 13 is composed of, for example, a built-in fixed storage device (a hard disk) or ROM. The computer program 100 stored in the storage device 13 is downloaded by the portable memory drive 16 from a portable recording medium 90 such as a DVD, a CD-ROM, a USB memory, or a SD card, on which the program and information such as data are recorded, and when executed, it is expanded from the storage device 13 to the memory 12 to be executed. Of course, it may also be a computer program downloaded from an external computer connected through the communication interface 17.

The storage device 13 may be provided with an identifier storage section 131. The identifier storage section 131 stores the coordinate values (latitude, longitude, and height) of the eight vertices that indicate a position space and information about the position space, in association with the imparted identifier. The "information about the position space" covers a wide range of concepts including not only the coordinate values (latitude, longitude, and height) of the eight vertices that form the position space but also various information useful for using the position space, for example, information about a store (information about business hours, new products, hot-selling products, etc.) if the store exists in said position space. This makes it possible to acquire necessary information without executing a search process using the identifier as key information each time, and the response of the search process is expected to improve for frequently used identifiers.

The communication interface 17 is connected to the internal bus 18 and can be connected to an external network such as the Internet, LAN, or WAN to send/receive data to/from, for example, an external computer.

The I/O interface 14 is connected to an input device such as a keyboard or a mouse and accepts data input. Since the present embodiment is described based on the premise that a portable and handheld terminal device (a smartphone, a tablet, etc.) constitutes the position space identifier imparting device 1, the input device is a touch display 21. The video interface 15 is connected to a display device such as a CRT display or a LCD display. In the present embodiment, it is connected to the touch display 21, which displays, for example, the position where you are on map information and also displays a position space ID as an identifier.

Figure 2:
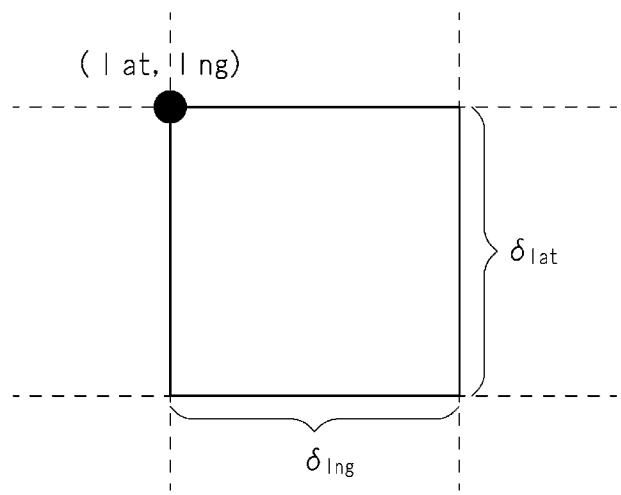
FIG. 2 is a conceptual diagram of a unit grid in the position space identifier imparting device according to the embodiment of the present invention.

First, the concept of the unit grid used in the present embodiment is defined. FIG. 2 is a conceptual diagram of the unit grid in the position space identifier imparting device 1 according to the embodiment of the present invention.

In FIG. 2, the unit grid is defined as an arbitrary rectangle composed of four vertices located on a celestial body. Specifically, for example, the position and size of the unit grid are specified by an arbitrary vertex (lat, lng) in the unit grid and the length δ lat of a side in the latitude direction and the length δ lng of a side in the longitude direction. In the present embodiment, the length δ lat of a side in the latitude direction and the length δ lng of a side in the longitude direction each are 1 [m].

Each unit grid has an error caused on a celestial body. This is because the vertices of the unit grid are coordinates on a plane, while the coordinates on a celestial body are coordinates on a sphere. Therefore, the present embodiment focuses on the difference in scale between the unit grid and the celestial body and devises a way to absorb the error within a range of the number of significant digits for each block, which is a collection of unit grids, and thereby the position spaces on the celestial body can be divided without overlapping each other.

Figure 3:
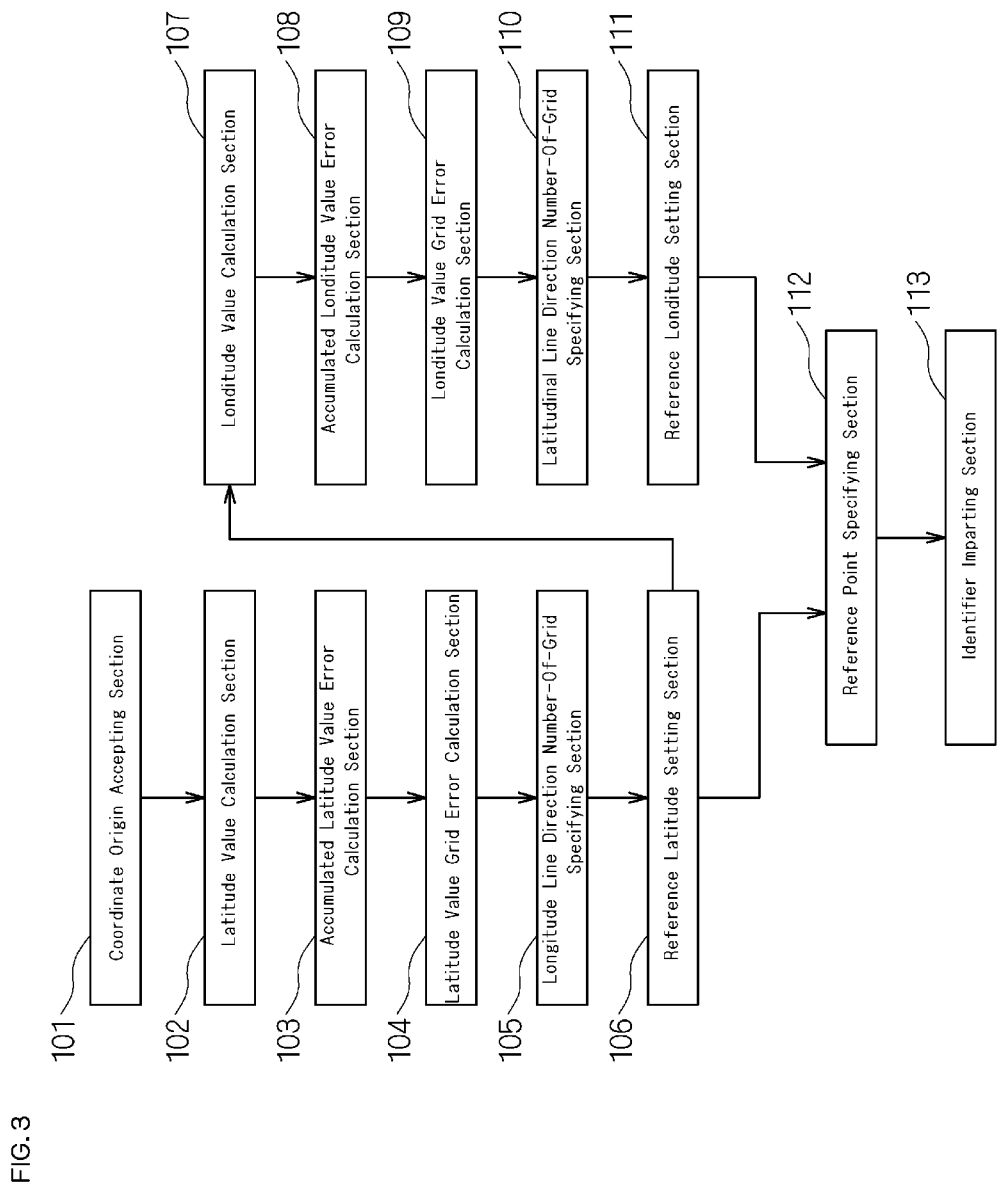
FIG. 3 is a functional block diagram of the position space identifier imparting device according to the embodiment of the present invention.

FIG. 3 is a functional block diagram of the position space identifier imparting device 1 according to the embodiment of the present invention. In FIG. 3, a coordinate origin accepting section 101 of the position space identifier imparting device 1 accepts a setting of an arbitrary coordinate origin, for example, a setting of (0 degrees latitude, 0 degrees longitude) as the coordinate origin. As long as the coordinate origin is common, the position space IDs, which are identifiers that identify position spaces, can be made common in the present invention. Therefore, standardizing the coordinate origin makes it possible to uniquely specify latitude and longitude, alternatively also height in addition thereto, with respect to the position space ID.

A latitude value calculation section 102 divides the longitude line passing through the coordinate origin whose setting has been accepted, by the length of one side of the unit grid and calculates a latitude value inside a unit grid thus divided. In this case, the unit grid means a square region with a fixed side length l [m], and a latitude value inside a unit grid means the difference in latitude between the upper and lower sides of the unit grid.

In the present embodiment, assuming that the unit grid is a square of l [m] squares, a rounding function Round (a, b) is used to calculate the latitude value per meter with Formula 1. The function Round (a, b) means a function that rounds the value of a to the number b of digits after the decimal point.

[Mathematical Formula 1]

$$\theta = \text{Round}(360/L_p, R+1) \quad \text{(Formula 1)}$$

Figure 4:
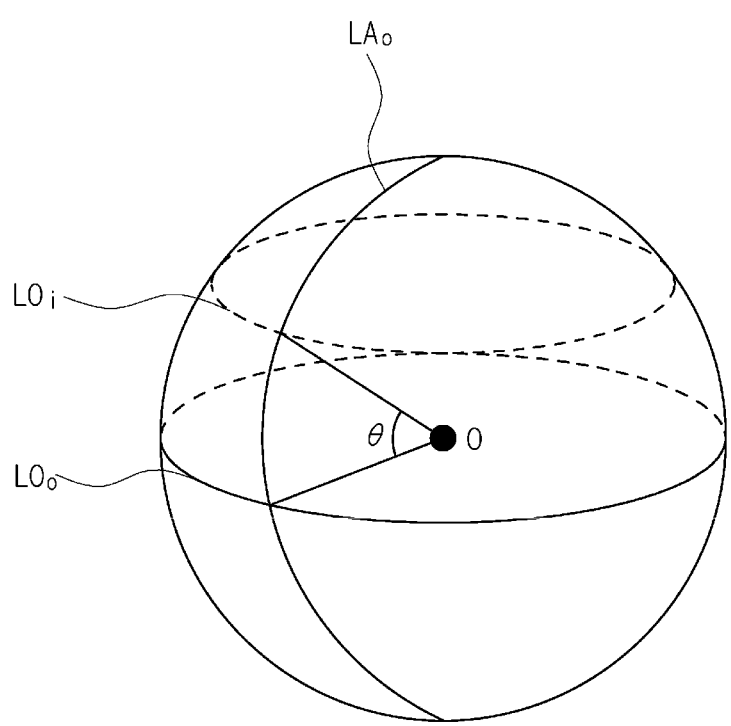
FIG. 4 is a diagram illustrating latitude value calculation in the position space identifier imparting device according to the embodiment of the present invention.

In Formula 1, R indicates the number of significant digits, in other words, the number of digits of an allowable error, and $\theta$ indicates the latitude value per meter along the longitude line. FIG. 4 is a diagram illustrating latitude value calculation in the position space identifier imparting device 1 according to the embodiment of the present invention.

Assuming that the celestial body is a sphere, the angle of elevation from the center point O of the sphere to an arbitrary point on a longitude line is defined as a latitude value $\theta$. Normally, a latitude is determined as an angle of elevation to a latitude line $LO_i$ with reference to the equatorial line (latitude line) $LO_0$. In Formula 1, with the longitude line length of a longitude line $LA_0$ being Lp [m], the latitude value $\theta$ per meter is determined.

Returning to FIG. 3, an accumulated latitude value error calculation section 103 calculates an accumulated error obtained in a case where the latitude values inside unit grids are accumulated for one round in the longitude line direction of the celestial body. Since the latitude values inside unit grids naturally contain errors, the errors are accumulated for one round of the celestial body along the longitude line $LA_0$ and thereby the accumulated error is calculated. The accumulated error E lat is calculated as shown in Formula 2.

[Mathematical Formula 2]

$$E_{lat} = 360 - (\theta * n_\theta * l) \quad \text{(Formula 2)}$$

where $n_\theta = \text{Round}(360/(\theta*l), 0)$

In Formula 2, n$\theta$ denotes the number of the unit grids placed along the longitude line and varies according to the length l of one side of a unit grid. It is a value converted to an integer using the formula described in the proviso of Formula 2.

A latitude value grid error calculation section 104 calculates an error E lat (g) per unit grid based on the calculated accumulated error. Specifically, the accumulated error E lat is divided by the number no of the unit grids located along the longitude line and thereby E lat (g) can be determined as shown in Formula 3.

[Mathematical Formula 3]

$$E_{lat}(g) = E_{lat}/n_\theta \quad \text{(Formula 3)}$$

A longitude line direction number-of-grid specifying section 105 specifies the number N of the unit grids included in one block in the longitude line direction so that based on the calculated error E lat (g) per unit grid, the reference error per block is within the range of the numbers of significant digits, for example, equal to or smaller than one thousandth ($10^{-3}$), of the accumulated error. The number N of the unit grids included in one block in the longitude line direction, where the number of significant digits is R, can be determined by Formula 4. In Formula 4, '0.5' is a correction value, which avoids divergence in the calculation process. Furthermore, Formula 4 indicates that the largest integer N in the range of the calculated numbers of the unit grids is determined.

[Mathematical Formula 4]

$$N = (0.5*10^{R-3}*n_\theta)/(\theta*l)*n_\theta \quad \text{(Formula 4)}$$

A reference latitude setting section 106 sequentially sets reference latitudes from the coordinate origin for each block determined by the specified number N of unit grids. In other words, the block is specified by the number of N unit grids, and the reference latitudes are set sequentially for each block. That is, the reference latitude $\theta i (i=0, 1, 2, 3, 4, \ldots, \text{Round}(n_\theta/N, 0))$ can be determined by Formula 5.

[Mathematical Formula 5]

$$\theta_i = iN*(l*\theta + E_{lat}(g)) \quad \text{(Formula 5)}$$

$(i=0, 1, 2, 3, 4 \ldots \text{Round}(n_\theta/N, 0))$

A longitude value calculation section 107 divides the latitude line for each reference latitude from the coordinate origin whose setting has been accepted, by the length of one side of the unit grid and calculates a longitude value $\Phi_i$ inside a unit grid thus divided for each latitude line as shown in Formula 6. That is, since celestial bodies such as the earth are spherical, the latitude lines vary in length depending on the latitude. Therefore, the latitude line length is calculated for each reference latitude from the coordinate origin, and each longitude value is calculated based on each latitude line length, respectively.

[Mathematical Formula 6]

$$\phi_i = \text{Round}(360/L_r \cos\theta i, R+1) \quad \text{(Formula 6)}$$

$(i=0, 1, 2, 3, 4 \ldots \text{Round}(n_\theta/N, 0))$

Figure 5:
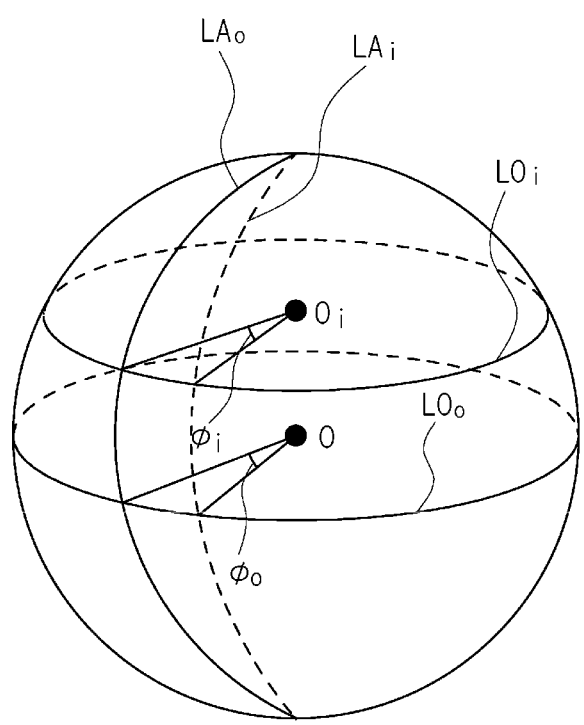
FIG. 5 is a diagram illustrating longitude value calculation in the position space identifier imparting device according to the embodiment of the present invention.

FIG. 5 is a diagram illustrating longitude value calculation in the position space identifier imparting device 1 according to the embodiment of the present invention. As shown in FIG. 5, with respect to the equatorial line (latitude line) $LO_0$, the longitude value $\Phi$ is determined as the angle $\Phi$ from the longitude line $LA_0$ passing through the coordinate origin to the longitude line $LA_i$ for which the longitude value is to be determined. However, assuming that the celestial body is a sphere, the latitude lines vary in latitude line length depending on the latitude value. Therefore, the longitude value $\Phi_i$ can be obtained on the latitude line $LO_i$ determined for each reference latitude in the same way as the longitude value $\Phi_0$ is determined on the equatorial line $LO_0$. This process is carried out for all the latitude lines determined for respective reference latitudes.

Returning to FIG. 3, an accumulated longitude value error calculation section 108 calculates an accumulated error obtained in a case where the longitude values for each latitude line are accumulated for one round in the latitude line direction of the celestial body. Since the longitude values naturally contain errors, the errors are accumulated for one round of the celestial body along the latitude line $LO_i$, for which each longitude value $\Phi_i$ has been determined, and thereby the accumulated error is calculated. The accumulated error E lng_i is calculated as shown in Formula 7.

[Mathematical Formula 7]

$$E_{lng\_i} = 360(\phi_i * n_{\phi\_i} * l) \quad \text{(Formula 7)}$$

where $n_{\phi\_i} = \text{Round}(360/(\phi\_i * l), 0)$

In Formula 7, $n_{\phi\_i}$ denotes the number of the unit grids placed along each latitude line and varies according to the length l of one side of a unit grid. It is a value converted to an integer using the formula described in the proviso of Formula 7.

A longitude value grid error calculation section 109 calculates an error E lng_i (g) per unit grid for each latitude line based on the accumulated error calculated for each latitude line. Specifically, the accumulated error E lng_i is divided by the number $n_{\phi\_i}$ of the unit grids located along the longitude line and thus it can be determined as shown in Formula 8.

[Mathematical Formula 8]

$$E_{lng\_i}(g) = E_{lng\_i}/n_{\phi\_i} \quad \text{(Formula 8)}$$

A latitudinal line direction number-of-grid specifying section 110 specifies the number Ni of the unit grids included in one block in the latitude line direction for each latitude line so that based on the calculated error E lng_i (g) per unit grid, the reference error per block is within the range of the numbers of significant digits, for example, equal to or smaller than one thousandth ($10^{-3}$), of the accumulated error. The number Ni of the unit grids included in one block in the longitude line direction, where the number of significant digits is R, can be determined by Formula 9. In Formula 9, '0.5' is a correction value, which avoids divergence in the calculation process. Furthermore, Formula 9 indicates that the largest integer Ni in the range of the calculated numbers of the unit grids is determined for each latitude line.

[Mathematical Formula 9]

$$Ni \leq (0.5 * 10^{R-3} * n_{\phi\_i})/(\phi\_i * l) \quad \text{(Formula 9)}$$

A reference longitude setting section 111 sequentially sets reference longitudes from the coordinate origin for each block determined by the specified number Ni of unit grids. In other words, the block is specified by the number of Ni unit grids, and the reference longitudes are set sequentially for each block. That is, the reference longitude $\Phi j$ (i=0, 1, 2, 3, 4, ..., Round($n_\theta$/N, 0), j=0, 1, 2, 3, 4, ..., Round($n_{\phi\_i}$/$N_{\phi\_i}$, 0)) can be determined by Formula 10.

[Mathematical Formula 10]

$$\phi_j = jN * (l_{\phi\_i} + E_{lng\_i}(g)) \quad \text{(Formula 10)}$$

(i=0, 1, 2, 3, 4 ... Round($n_\theta$/N,0))

(j=0, 1, 2, 3, 4 ... Round($n_{\phi\_i}$/$N_{\phi\_i}$,0))

Figure 6:
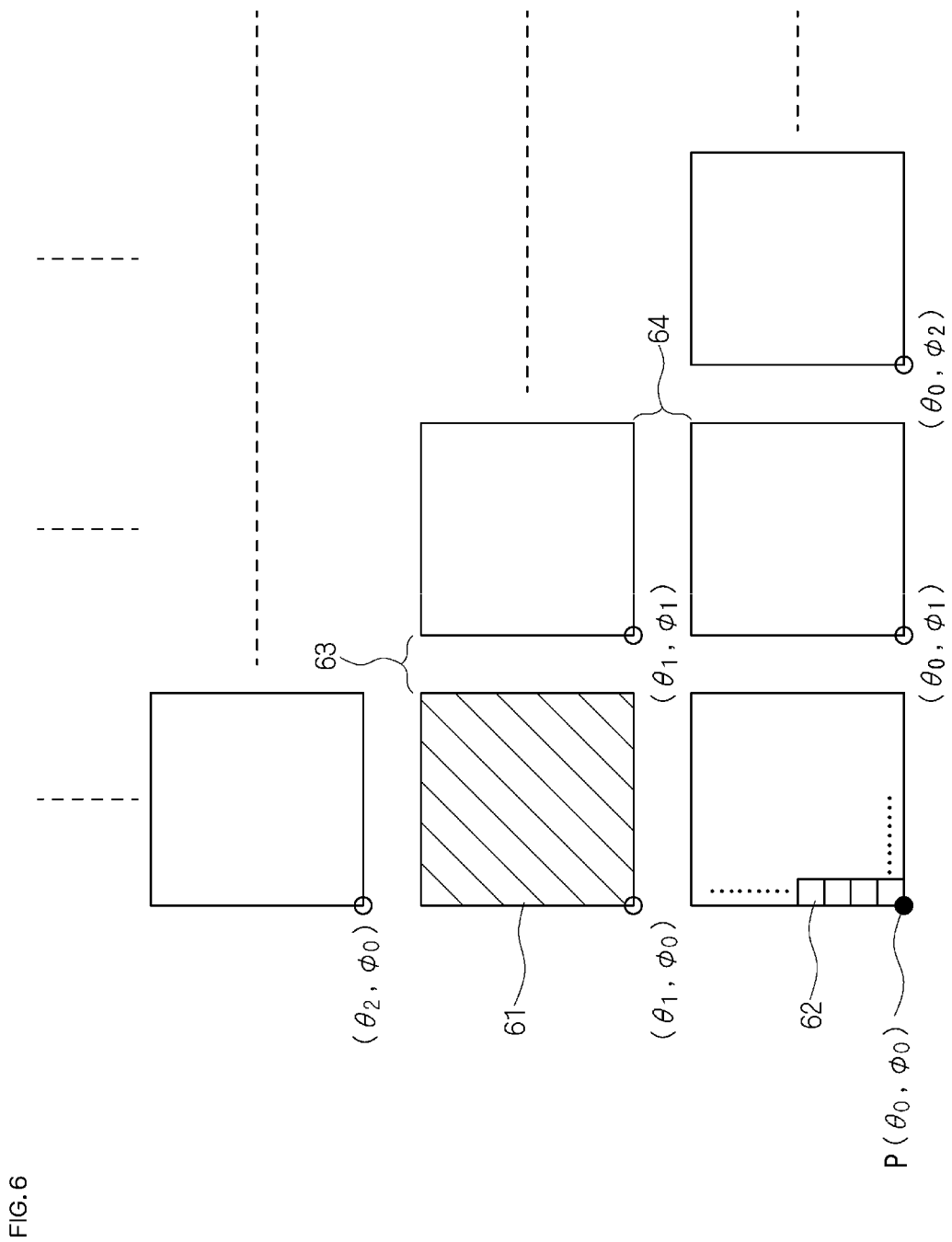
FIG. 6 is a diagram illustrating a method of specifying reference points in the position space identifier imparting device according to the embodiment of the present invention.

A reference point specifying section 112 specifies reference points sequentially from the coordinate origin based on the reference latitudes and reference longitudes that have been set. FIG. 6 is a diagram illustrating a method of specifying reference points in the position space identifier imparting device 1 according to the embodiment of the present invention.

As shown in FIG. 6, when the coordinate values of the coordinate origin P are set as ($\theta_0$, $\Phi_0$), in the longitude line direction, the reference points are the points at which the latitude value $\theta$ indicated in Formula 5 changes in block units. For example, the reference points on the longitude value $\Phi_0$ are ($\theta_1$, $\Phi_0$), ($\theta_2$, $\Phi_0$), ... in order from the coordinate origin P.

On the other hand, in the latitude line direction, the reference points are the points at which the longitude value $\Phi$ indicated in Formula 10 changes in block units. For example, the reference points on the longitude value $\Phi_0$ are ($\theta_0$, $\Phi_1$), ($\theta_0$, $\Phi_2$), ... in order from the coordinate origin P.

Returning to FIG. 3, an identifier imparting section 113 imparts a unique identifier to each unit grid located in a block with the specified reference points as their vertices. In FIG. 6, respective unit grids 62 constituting a block 61 are imparted with identifiers, for example, grid IDs, that are different from one another.

With the reference points being specified in this way, when the coordinate origin is standardized, the reference points also are always the same. Therefore, for example, no matter which organization created the map information, the reference points themselves can be easily standardized and common identifiers can be imparted.

Figure 7:
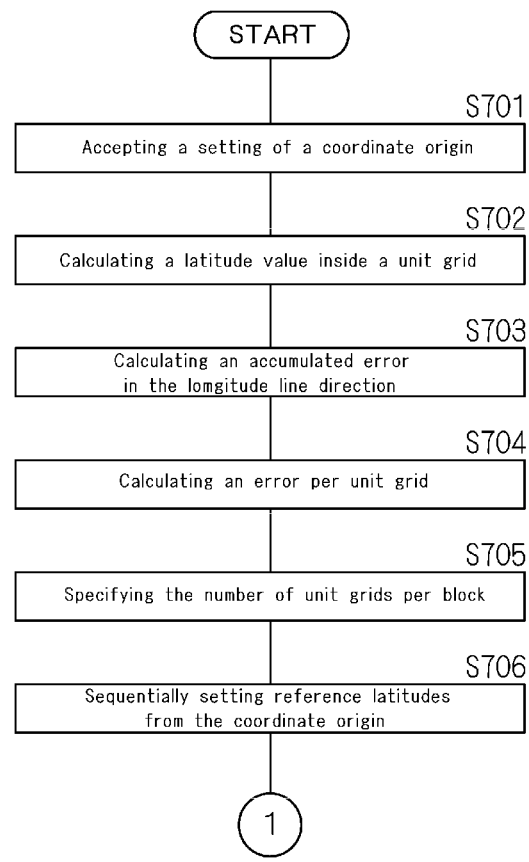
FIG. 7 is a flowchart showing a procedure of imparting a unique identifier to a position space in the position space identifier imparting device according to the embodiment of the present invention.
Figure 8:
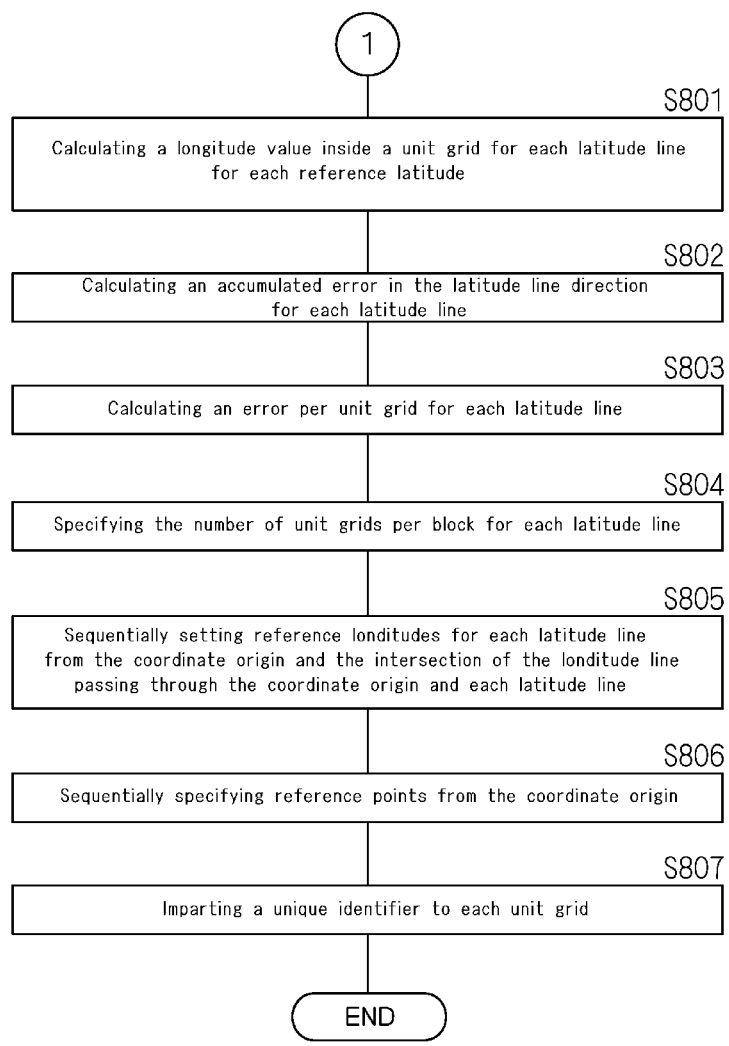
FIG. 8 is a flowchart showing the procedure of imparting a unique identifier to a position space in the position space identifier imparting device according to the embodiment of the present invention.

FIGS. 7 and 8 each are a flowchart showing a procedure of imparting a unique identifier to a position space in the position space identifier imparting device 1 according to the embodiment of the present invention. First, in FIG. 7, the CPU 11 of the position space identifier imparting device 1 according to the present embodiment accepts a setting of an arbitrary coordinate origin, for example, a setting of (0 degrees latitude, 0 degrees longitude) as the coordinate origin (Step S701). As long as the coordinate origin is common, the position space IDs, which are identifiers that identify position spaces, can be made common in the present invention. Therefore, standardizing the coordinate origin makes it possible to uniquely specify latitude and longitude, alternatively also height in addition thereto, with respect to each position space ID.

The CPU 11 divides the longitude line passing through the coordinate origin whose setting has been accepted, by the length of one side of the unit grid and calculates a latitude value inside a unit grid thus divided (Step S702). The CPU 11 calculates an accumulated error obtained in a case where the latitude values inside unit grids are accumulated for one round in the longitude line direction of the celestial body (Step S703).

The CPU 11 calculates the error E lat (g) per unit grid based on the calculated accumulated error (Step S704) and specifies the number N of the unit grids included in one block in the longitude line direction so that the reference error per block is outside the range of the numbers of significant digits, for example, equal to or smaller than one thousandth ($10^{-3}$), of the accumulated error (Step S705). Since the number N of the unit grids per block is specified so as to be out of the range of the numbers of significant digits of the accumulated error, the reference error per block that is present can be regarded as being absent.

The CPU 11 sequentially sets reference latitudes from the coordinate origin for each block determined by the specified number N of unit grids (Step S706). Specifically, since one block is composed of N unit grids, the reference latitudes are set sequentially for each block from the coordinate origin, which makes it possible to set the reference point in the longitude line direction for each block.

In FIG. 8, the CPU 11 divides the latitude line for each reference latitude from the coordinate origin whose setting has been accepted, by the length of one side of the unit grid and calculates a longitude value inside a unit grid thus divided for each latitude line (Step S801). That is, since celestial bodies such as the earth are spherical, the latitude lines vary in length depending on the latitude. Therefore, the latitude line length is calculated for each reference latitude from the coordinate origin, and each longitude value is calculated based on each latitude line length, respectively.

The CPU 11 calculates, for each latitude line, an accumulated error obtained in a case where the longitude values for each latitude line are accumulated for one round in the latitude line direction of the celestial body (Step S802). Based on the accumulated error calculated for each latitude line, the CPU 11 calculates an error per unit grid for each latitude line (Step S803).

The CPU 11 specifies the number of the unit grids included in one block in the latitude line direction so that based on the calculated error per unit grid, the reference error per block is within the range of the numbers of significant digits, for example, equal to or smaller than one thousandth ($10^{-3}$), of the accumulated error for each latitude line (Step S804).

The CPU 11 sequentially sets reference longitudes from the coordinate origin for each block determined by the specified number of unit grids (Step S805). Specifically, since one block is composed of Ni unit grids for each latitude line, the reference longitudes for each latitude line are set sequentially for each block from the coordinate origin and the intersection of the longitude line passing through the coordinate origin and each latitude line, so that the reference point in the latitude line direction for each block can be set for each latitude line.

The CPU 11 specifies reference points sequentially from the coordinate origin based on the reference latitudes and reference longitudes that have been set (Step S806). The CPU 11 imparts a unique identifier to each unit grid located in a block with the specified reference points as its vertices (Step S807).

As can also be seen from FIG. 6, the coordinate values of the reference points include an error 64 in block units in the latitude direction and an error 63 in block units in the longitude direction. That is, at the stage of specifying the reference points, the number of unit grids to be included in one block is determined so that the errors are negligible in size.

When the blocks are arranged on the longitude or latitude lines of the celestial body as described above, there may be overlapping portions when they are arranged for one round of the celestial body. Therefore, in the position space identifier imparting device 1 according to the present embodiment, since there may be overlapping unit grids in the vicinity of the coordinate origin, it is determined whether or not a unique identifier has already been imparted, and when it is determined that a unique identifier has been imparted, the unique identifier that has already been imparted is selected as the identifier for said unit grid.

Figure 9:
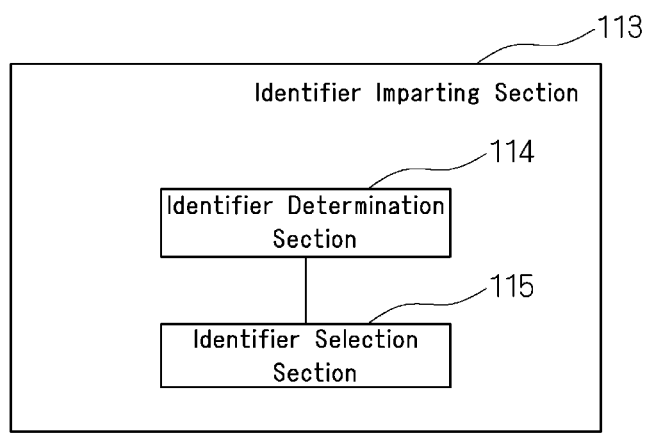
FIG. 9 is a functional block diagram of an identifier imparting section of the position space identifier imparting device according to the embodiment of the present invention.

FIG. 9 is a functional block diagram of the identifier imparting section 113 of the position space identifier imparting device 1 according to the embodiment of the present invention. As shown in FIG. 9, the identifier imparting section 113 includes an identifier determination section 114 and an identifier selection section 115.

The identifier determination section 114 determines whether or not a unique identifier has already been imparted to the overlapping unit grid in the vicinity of the coordinate origin where unit grids overlap each other when blocks, each surrounded by the reference points, are arranged over the entire circumference from the coordinate origin.

When the identifier determination section 114 determines that a unique identifier has already been imparted, the identifier selection section 115 selects the unique identifier that has already been imparted as the identifier for said unit grid. This makes it possible to impart a unique identifier even when grids overlap each other.

As described above, according to the present embodiment, even for a celestial body that is not a true sphere such as the earth, the distance between reference points is determined so that the error in a block from the coordinate origin that serves as a reference is equal to or smaller than one thousandth of the accumulated error for the entire latitude or longitude line. Therefore, when the coordinate origin is common, the distance between reference points is uniquely determined, and it becomes possible to impart a non-overlapping unique identifier to each position space surrounded by the reference points. Thus, unique identifiers that do not overlap each other can be imparted to all position spaces on the celestial body. In other words, it is possible to ensure that the position spaces that are identical in latitude and longitude (alternatively, also height in addition thereto) always have a common unique identifier, which makes it easy to transfer data between a plurality of applications that use position information and also makes it possible to improve system response.

The present invention is not limited to the example described above and can be subjected to various modifications, improvements, etc. as long as they are within the scope of the objective of the present invention. For instance, in the example described above, identifiers are imparted for the positions divided on the ground with respect to the ground of the celestial body. However, the present invention is not particularly limited thereto. With information on the height direction being additionally included, it also becomes possible to impart a unique identifier to the space in a similar manner.

Figure 10:
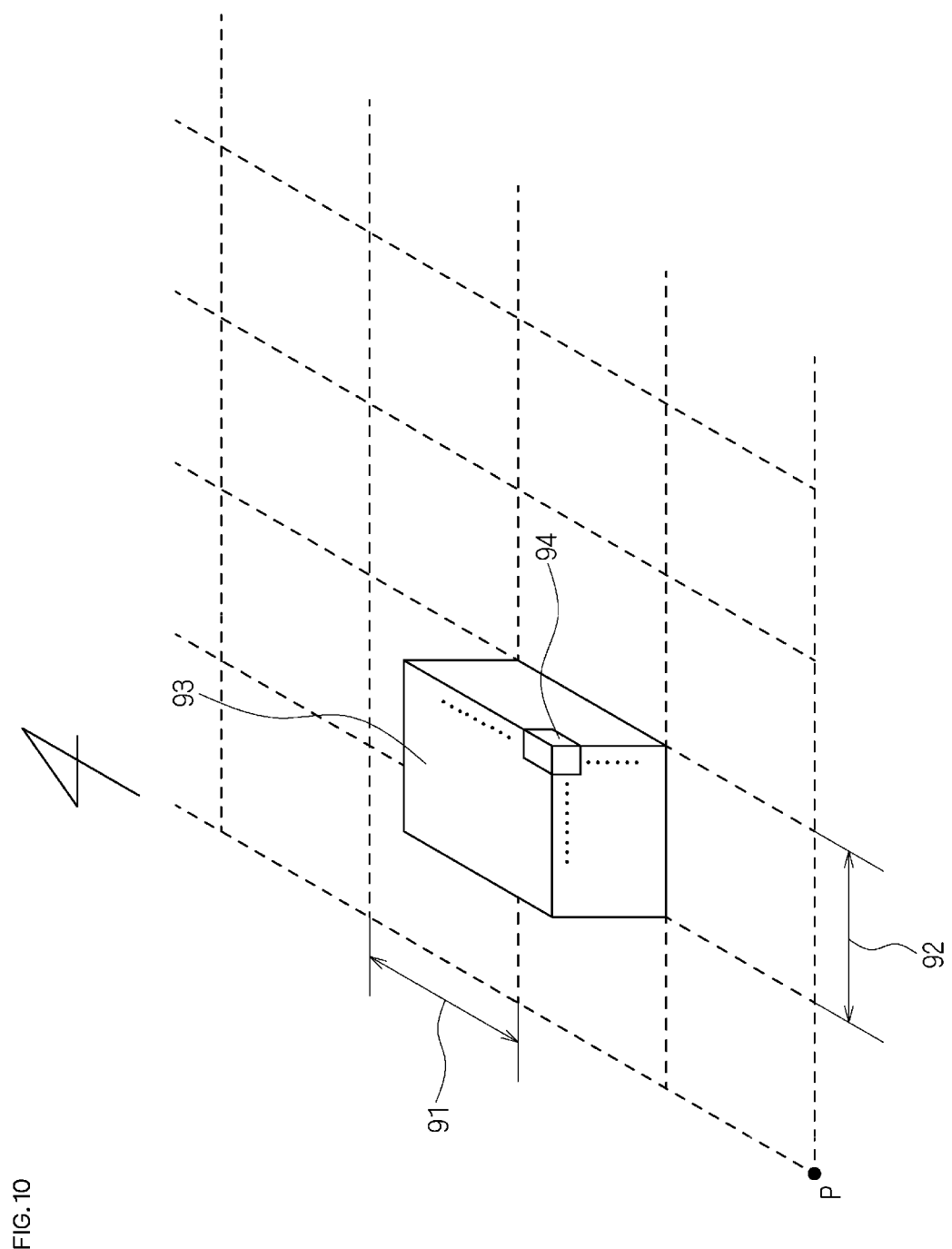
FIG. 10 is a diagram showing an example of a three-dimensional block determined by reference points in the position space identifier imparting device according to the embodiment of the present invention.

For example, a distance on the surface of the celestial body corresponding to the reference latitude or reference longitude calculated by the method described above is used as a unit height, and thereby reference points can also be set in the height direction. FIG. 10 is a diagram showing an example of a three-dimensional block determined by reference points of the position space identifier imparting device 1 according to the embodiment of the present invention.

As shown in FIG. 10, with a length 91 corresponding to the reference latitudes and a length 92 corresponding to the reference longitudes, reference points are set on the ground of the celestial body with reference to the coordinate origin P. New reference points are set above the rectangle with the reference points as its vertices, at the same height as the length 91 corresponding to the reference latitudes or the length 92 corresponding to the reference longitudes. The reference points are sequentially set in the height direction, and a rectangular region surrounded by the eight vertices is defined as a three-dimensional block 93.

By arranging unit 3D grids 94, each of which is a square region with one side of 1 [m], in the three-dimensional block 93, the unit 3D grids 94 each are imparted with an identifier for each position. That is, the identifier imparting section 113 can impart a unique identifier to each unit 3D grid 94 for a position space in three-dimensional space. This makes it possible to impart a unique identifier to every position space on the celestial body.

Furthermore, it is preferable that the identifier storage section 131 be provided, which cumulatively stores the imparted identifiers each time. The identifier storage section 131 stores information about the latitudes, longitudes, and heights of the eight vertices that indicate the position space in association with the imparted identifier. Therefore, it is not necessary to perform a calculation process to impart an identifier again to the position space to which the identifier has already been imparted once, and any information process can be performed in units of identifiers with respect to the position spaces that are frequently used. Thus, an improvement in response is expected.

DESCRIPTIONS OF REFERENCE NUMERALS

1 Position Space Identifier Imparting Device
11 CPU
12 Memory
13 Storage Device
14 I/O Interface
15 Video Interface
16 Portable Memory Drive
17 Communication Interface
18 Internal Bus
90 Portable Recording Medium
100 Computer Program

The invention claimed is:

1. A method by a computer to identify a position space, from among position spaces, for map information displayable by a display device, based on information obtained by the computer to indicate the position space on a celestial body divided into a plurality of equal blocks, each block of the plurality of equal blocks constituted by unit grids, respectively, the method by the computer comprising:

accepting a setting of a coordinate origin with respect to the celestial body;

dividing, with respect to the celestial body, a longitude line passing through the coordinate origin, by a length of one side of a unit grid of the unit grids, and calculating latitude values inside the unit grids, respectively;

calculating an accumulated error obtained in a case where the latitude values inside the unit grids, respectively, are accumulated for one round of the celestial body along a direction of the longitude line;

calculating an error per unit grid of the unit grids based on the accumulated error;

specifying a number of unit grids constituting each block of the plurality of equal blocks in the direction of the longitude line divided, so that based on the error calculated per unit grid of the number of unit grids specified, a reference error for each block of the plurality of equal blocks is equal to or smaller than one thousandth of the accumulated error;

sequentially setting reference latitudes from the coordinate origin for each block of the plurality of equal blocks constituted by the number of unit grids specified in the direction of the longitude line divided, respectively;

dividing latitude lines of the celestial body for each reference latitude of the reference latitudes from the coordinate origin, respectively, by the length of one side of the unit grid, and calculating longitude values inside the unit grids for each latitude line of the latitude lines;

calculating an accumulated error obtained in a case where the longitude values inside the unit grids are accumulated for one round of the celestial body along a direction of a latitude line of the latitude lines;

calculating an error per unit grid of the unit grids for each latitude line of the latitude lines based on the accumulated error calculated for each latitude line;

specifying a number of unit grids constituting each block of the plurality of equal blocks in the direction of a latitude line divided for each latitude line of the latitude lines, so that based on the error calculated per unit grid of the number of unit grids specified, a reference error for each block of the plurality of equal blocks is equal to or smaller than one thousandth of the accumulated error;

sequentially setting reference longitudes for each latitude line of the latitude lines for each block of the plurality of equal blocks constituted by the number of unit grids specified in the direction of the latitude line;

sequentially specifying reference points from the coordinate origin based on the reference latitudes and the reference longitudes that have been set; and imparting a non-overlapping unique identifier to each unit grid of the unit grids specified to constitute each block of the plurality of equal blocks, with the reference points as vertices of each unit grid of the unit grids, respectively, when transferring data between a plurality of applications that use position information about the position space on the map information displayed on the display device, based on the non-overlapping unique identifier.

2. The method according to claim 1, wherein a distance on a surface of the celestial body corresponding to a reference latitude among the reference latitudes or a reference longitude among the reference longitudes is used as a unit height to construct a unit 3D grid with a height added to the unit grid, and a non-overlapping unique identifier is imparted to the unit 3D grid for a position space in a three-dimensional space.

3. The method according to claim 1, wherein a length of a latitude line for each reference latitude is a product of a cosine of a latitude value and an equatorial length.

4. The method according to claim 3, wherein in a vicinity of the coordinate origin where an overlap occurs when the plurality of equal blocks, each surrounded by the reference points, are arranged over an entire circumference from the coordinate origin, determining whether a non-overlapping unique identifier has already been imparted to an overlapping unit grid of the unit grids, and when determined that the non-overlapping unique identifier has already been imparted, selecting the non-overlapping unique identifier that has already been imparted for the overlapping unit grid.

5. The method according to claim 3, wherein a distance on a surface of the celestial body corresponding to a reference latitude among the reference latitudes or a reference longitude among the reference longitudes is used as a unit height to construct a unit 3D grid with a height added to the unit grid, and a non-overlapping unique identifier is imparted to the unit 3D grid for a position space in three-dimensional space.

6. The method according to claim 1, wherein in a vicinity of the coordinate origin where an overlap occurs when the plurality of equal blocks, each surrounded by the reference points, are arranged over an entire circumference from the coordinate origin, determining whether a non-overlapping unique identifier has already been imparted to an overlapping unit grid of the unit grids, and when determined that the non-overlapping unique identifier has already been imparted, selecting the non-overlapping unique identifier that has already been imparted for the overlapping unit grid.

7. The method according to claim 6, wherein a distance on a surface of the celestial body corresponding to a reference latitude among the reference latitudes or a reference longitude among the reference longitudes is used as a unit height to construct a unit 3D grid with a height added to the unit grid, and non-overlapping unique identifier is imparted to the unit 3D grid for a position space in three-dimensional space.

8. A device to identify a position space, from among position spaces, for map information displayable by a display device, based on information obtained by the device to indicate the position space on a celestial body divided into a plurality of equal blocks, each bock of the plurality of equal blocks constituted by unit grids, respectively, the device comprising:

a processor; and a memory to store a computer program which when executed by the processor causes the processor to perform a process to identify the position space by, accepting a setting of a coordinate origin with respect to the celestial body;

dividing, with respect to the celestial body, a longitude line passing through the coordinate origin, by a length of one side of a unit grid of the unit grids, and calculates latitude values inside the unit grids, respectively;

calculating an accumulated error obtained in a case where the latitude values inside the unit grids, respectively, are accumulated for one round of the celestial body along a direction of the longitude line;

calculating an error for each unit grid of the unit grids based on the accumulated error;

specifying a number of unit grids constituting each block of the plurality of equal blocks in the direction of the longitude line divided, so that based on the error calculated for each unit grid of the number of unit grids specified, a reference error for each block of the plurality of equal blocks is equal to or smaller than one thousandth of the accumulated error;

sequentially setting reference latitudes from the coordinate origin for each block of the plurality of equal blocks constituted by the number of unit grids specified in the direction of the longitude line divided, respectively;

dividing latitude lines of the celestial body for each reference latitude of the reference latitudes from the coordinate origin, respectively, by the length of one side of the unit grid, and calculating longitude values inside the unit grids for each latitude line of the latitude lines;

calculating an accumulated error obtained in a case where the longitude values inside the unit grids are accumulated for one round of the celestial body along a direction of a latitude line of the latitude lines;

calculating an error per unit grid of the unit grids for the latitude line based on the accumulated error calculated for the latitude line;

specifying a number of unit grids constituting each block of the plurality of equal blocks in the direction of the latitude line divided, so that based on the error per unit grid, a reference error per block is equal to or smaller than one thousandth of the accumulated error;

sequentially setting reference longitudes for each latitude line of latitude lines for each block of the plurality of equal blocks constituted by the number of unit grids specified in the direction of the latitude line;

sequentially specifying reference points from the coordinate origin based on the reference latitudes and the reference longitudes that have been set; and imparting a non-overlapping unique identifier to each unit grid of the unit grids specified to constituted each block of the plurality of equal blocks, with the reference points as vertices of each unit grid of the unit grids, respectively, when transferring data between a plurality of applications that use position information about the position space on the map information displayed on the display device, based on the non-overlapping unique identifier.

9. The device according to claim 8, wherein a distance on a surface of the celestial body corresponding to a reference latitude among the reference latitudes or a reference longitude among the reference longitudes is used as a unit height to construct a unit 3D grid with a height added to the unit grid, and the process further includes imparting a non-overlapping unique identifier to the unit 3D grid for a position space in three-dimensional space.

10. The device according to claim 8, wherein the process further comprises:

determining whether a unique identifier has already been imparted to an overlapping unit grid of the unit grids in a vicinity of the coordinate origin where an overlap occurs when the plurality of equal blocks, each surrounded by the reference points, are arranged over an entire circumference from the coordinate origin, and when determined that a unique identifier has already been imparted, selecting the non-overlapping unique identifier that has already been imparted as an identifier for the overlapping unit grid.

11. The device according to claim 8, wherein a length of a latitude line for each reference latitude is a product of a cosine of a latitude value and an equatorial length.

12. The device according to claim 11, wherein the process further comprises:

determining whether a non-overlapping unique identifier has already been imparted to an overlapping unit grid of the unit grids in a vicinity of the coordinate origin where an overlap occurs when the plurality of equal blocks, each surrounded by the reference points, are arranged over an entire circumference from the coordinate origin, and when determined that the non-overlapping unique identifier has already been imparted, selecting the non-overlapping unique identifier that has already been imparted for the overlapping unit grid.

13. The device according to claim 12, wherein a distance on a surface of the celestial body corresponding to a reference latitude among reference latitudes or a reference longitude among reference longitudes is used as a unit height to construct a unit 3D grid with a height added to the unit grid, and the process further includes imparting a non-overlapping unique identifier to the unit 3D grid for a position space in three-dimensional space.

14. The device according to claim 11, wherein a distance on a surface of the celestial body corresponding to a reference latitude among reference latitudes or a reference longitude among the reference longitudes is used as a unit height to construct a unit 3D grid with a height added to the unit grid, and the process further includes imparting a non-overlapping unique identifier to the unit 3D grid for a position space in three-dimensional space.

15. A non-transitory computer readable medium storing a computer program, which when executed by a computer, constitutes a process to identify a position space, from among position spaces, for map information displayable by a display device, based on information obtained by the computer to indicate the position space on a celestial body divided into a plurality of equal blocks, each block of the plurality of equal blocks constituted by unit grids, respectively by:

accepting a setting of a coordinate origin with respect to the celestial body;

dividing, with respect to the celestial body, a longitude line passing through the coordinate origin, by a length of one side of a unit grid of the unit grids, and calculates latitude values inside the unit grids, respectively;

calculating an accumulated error obtained in a case where the latitude values inside the unit grids, respectively, are accumulated for one round of the celestial body along a direction of the longitude line;

calculating an error for each unit grid of the unit grids based on the accumulated error;

specifying a number of unit grids constituting each block of the plurality of equal blocks in the direction of the longitude line divided, so that based on the error calculated for each grid of the number of unit grids specified, a reference error for each block of the plurality of equal blocks is equal to or smaller than one thousandth of the accumulated error;

sequentially setting reference latitudes from the coordinate origin for each block of the plurality of equal blocks constituted by the number of unit grids specified in the direction of the longitude line divided, respectively;

dividing latitude lines of the celestial body for each reference latitude of the reference latitudes from the coordinate origin, respectively, by the length of one side of the unit grid, and calculating longitude values inside the unit grids for each latitude line of the latitude lines;

calculating an accumulated error obtained in a case where the longitude values inside the unit grids are accumulated for one round of the celestial body along a direction of a latitude line of the latitude lines;

calculating an error per unit grid of the unit grids for each latitude line of the latitude lines based on the accumulated error calculated for each latitude line;

specifying a number of unit grids constituting each block of the plurality of equal blocks in the direction of the latitude line divided for each latitude line of the latitude lines, so that based on the error calculated per unit grid of the number of unit grids specified, a reference error for each block of the plurality of equal blocks is equal to or smaller than one thousandth of the accumulated error;

sequentially setting reference longitudes for each latitude line of the latitude lines for each block of the plurality of equal blocks constituted by the number of unit grids specified in the direction of the latitude line;

sequentially specifying reference points from the coordinate origin based on reference latitudes and the reference longitudes that have been set; and imparting a non-overlapping unique identifier to each unit grid of the unit grids specified to constitute each block of the plurality of equal blocks, with the reference points as vertices of each unit grid of the unit grids, respectively, when transferring data between a plurality of applications that use position information about the position space on the map information displayed on the display device, based on the non-overlapping unique identifier.

16. The non-transitory computer readable medium according to claim 9, wherein a distance on a surface of the celestial body corresponding to a reference latitude among the reference latitudes or a reference longitude among the reference longitudes is used as a unit height to construct a unit 3D grid with a height added to the unit grid, and the process further includes imparting a non-overlapping unique identifier to the unit 3D grid for a position space in three-dimensional space.

17. The non-transitory computer readable medium according to claim 15, wherein a length of a latitude line for each reference latitude is a product of a cosine of a latitude value and an equatorial length.

18. The non-transitory computer readable medium according to claim 17, wherein the process further comprises:

determining whether a non-overlapping unique identifier has already been imparted to an overlapping unit grid of the unit grids in a vicinity of the coordinate origin where an overlap occurs when the plurality of equal blocks, each surrounded by the reference points, are arranged over an entire circumference from the coordinate origin; and when determined that the non-overlapping unique identifier has already been imparted, selecting the non-overlapping unique identifier that has already been imparted for the overlapping unit grid.

19. The non-transitory computer readable medium according to claim 17, wherein the process further comprises:

determining whether a unique identifier has already been imparted to an overlapping unit grid of the unit grids in a vicinity of the coordinate origin where an overlap occurs when the plurality of equal blocks, each surrounded by the reference points, are arranged over an entire circumference from the coordinate origin; and when determined that a unique identifier has already been imparted, selecting the non-overlapping unique identifier that has already been imparted as an identifier for the overlapping unit grid.

20. The non-transitory computer readable medium according to claim 19, wherein a distance on a surface of the celestial body corresponding to a reference latitude among the reference latitudes or a reference longitude among the reference longitudes is used as a unit height to construct a unit 3D grid with a height added to the unit grid, and the process further includes imparting a non-overlapping unique identifier to the unit 3D grid for a position space in three-dimensional space.

* * * * *